US 8,116,288 B2

(12) United States Patent
Frid-Nielsen et al.

(10) Patent No.: US 8,116,288 B2
(45) Date of Patent: *Feb. 14, 2012

(54) METHOD FOR DISTRIBUTING DATA, ADAPTED FOR MOBILE DEVICES

(75) Inventors: Martin Frid-Nielsen, Menlo Park, CA (US); Steven Ray Boye, Vaerloese (DK); Lars Gunnersen, Hilleroed (DK); Song Zun Huang, Scotts Valley, CA (US)

(73) Assignee: Soonr Corporation, Campbell, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 11/238,838

(22) Filed: Sep. 29, 2005

(65) Prior Publication Data

US 2007/0058596 A1    Mar. 15, 2007

Related U.S. Application Data

(60) Provisional application No. 60/715,415, filed on Sep. 9, 2005.

(51) Int. Cl.
*H04W 4/00* (2009.01)
(52) U.S. Cl. ............ 370/338; 370/259; 455/426.2; 704/231; 704/251; 704/254; 704/270; 709/220; 709/201; 709/203; 709/204; 705/15; 705/20; 705/22; 705/35; 705/40
(58) Field of Classification Search ............ 455/414.1, 455/456.1, 426.2; 370/310–350, 259; 704/231, 704/251, 254, 270, 275, 205, 244; 709/220, 709/201, 203, 204; 705/15, 20, 22, 35, 40
See application file for complete search history.

(56) References Cited

U.S. PATENT DOCUMENTS

| 6,134,660 | A | 10/2000 | Boneh et al. |
| 6,216,173 | B1 | 4/2001 | Jones et al. |
| 6,385,193 | B1 * | 5/2002 | Civanlar et al. ............ 370/352 |
| 6,522,883 | B2 * | 2/2003 | Titmuss et al. ............ 455/445 |
| 6,574,733 | B1 | 6/2003 | Langford |
| 6,606,495 | B1 * | 8/2003 | Korpi et al. ............ 455/432.1 |
| 6,618,366 | B1 | 9/2003 | Furukawa et al. |
| 6,690,274 | B1 | 2/2004 | Bristol |
| 6,721,286 | B1 | 4/2004 | Williams et al. |

(Continued)

FOREIGN PATENT DOCUMENTS

WO    0048400    8/2000

OTHER PUBLICATIONS

Written Opinion and International Search Report for PCT Application PCT/US06/37670 published on Sep. 26, 2007.

(Continued)

*Primary Examiner* — Dwayne Bost
*Assistant Examiner* — Amancio Gonzalez
(74) *Attorney, Agent, or Firm* — Haynes Beffel & Wolfeld LLP; Warren S. Wolfeld (57) ABSTRACT

A method for distributing data in a heterogeneous network. The method operates on a private mobile network, which includes a mobility server, mobile components and fixed components, on which the mobility server includes data storage units that store data on behalf of network members, at least some of such data being stored in multiple data formats. The distribution method includes transmitting upon request selected said data to addressees, each such transmission being formatted for acceptance by each respective addressee.

10 Claims, 6 Drawing Sheets

U.S. PATENT DOCUMENTS

| | | | |
|---|---|---|---|
| 7,099,928 | B2 | 8/2006 | Aoki et al. |
| 7,289,964 | B1 | 10/2007 | Bowman-Amuah |
| 7,602,748 | B2 * | 10/2009 | Sinnreich et al. ............. 370/331 |
| 7,779,069 | B2 * | 8/2010 | Frid-Nielsen et al. ........ 709/203 |
| 2002/0022453 | A1 * | 2/2002 | Balog et al. ..................... 455/41 |
| 2002/0033844 | A1 | 3/2002 | Levy et al. |
| 2002/0081995 | A1 | 6/2002 | Leppinen et al. |
| 2002/0097411 | A1 * | 7/2002 | Roche et al. ................... 358/1.9 |
| 2002/0190876 | A1 | 12/2002 | Lai et al. |
| 2003/0023671 | A1 | 1/2003 | Abdulrahiman et al. |
| 2003/0023756 | A1 | 1/2003 | Awamoto et al. |
| 2003/0101201 | A1 | 5/2003 | Saylor et al. |
| 2004/0205452 | A1 | 10/2004 | Fitzsimons et al. |
| 2004/0258063 | A1 | 12/2004 | Raith et al. |
| 2005/0010697 | A1 | 1/2005 | Kinawi et al. |
| 2005/0137983 | A1 | 6/2005 | Bells |
| 2005/0165869 | A1 | 7/2005 | Huang et al. |
| 2005/0182672 | A1 | 8/2005 | Hemm et al. |
| 2006/0218234 | A1 * | 9/2006 | Deng et al. .................... 709/206 |
| 2006/0227705 | A1 | 10/2006 | Chandwadkar et al. |
| 2006/0245403 | A1 * | 11/2006 | Kumar .......................... 370/338 |
| 2006/0256751 | A1 | 11/2006 | Jagadeesan et al. |
| 2007/0058597 | A1 | 3/2007 | Frid-Nielsen et al. |
| 2007/0061394 | A1 | 3/2007 | Frid-Nielsen et al. |
| 2008/0082541 | A1 | 4/2008 | Davidson et al. |
| 2008/0201343 | A1 | 8/2008 | Crescenti et al. |
| 2009/0070411 | A1 * | 3/2009 | Chang et al. .................. 709/203 |

OTHER PUBLICATIONS

Final Office Action mailed Apr. 20, 2009, U.S. Appl. No. 11/238,839.
Office Action, U.S. Appl. No. 11/238,839, mailed Aug. 19, 2008.
International Search Report and Written Opinion for PCT/US06/37672; published Oct. 19, 2007.
Office Action, U.S. Appl. No. 11/239,669, mailed Sep. 4, 2008.
Office Action, mailed Jun. 10, 2009, U.S. Appl. No. 11/239,669.
IBM Tech. Disclosure Bulletin, "Timely Policy-Based Event-Driven Backups of Ciritcal Files," vol. 39(4), Apr. 1996, pp. 127-129.
Supplementary European Search Report for EP 06 82 5161 completed Oct. 27, 2009.
Notice of Allowance mailed Apr. 7, 2010 in U.S. Appl. 11/238,839.
Mar. 3, 2009 Response filed to Sep. 4, 2008 OA in U.S. Appl. No. 11/239,669.
Dec. 10, 2009 Response to Office Action mailed Jun. 10, 2009 in U.S. Appl. No. 11/239,669.
Final Office Action mailed Apr. 5, 2010 in U.S. Appl. No. 11/239,669.
Apr. 23, 2007 International Search Report for PCT/US06/35103.
Mohan R et al., "Adapting Multimedia Internet Content for Universal Access," IEEE Transactions on Multimedia, vol. 1, No. 1, Mar. 1, 1999, pp. 104-114.
Supplementary European Search Report for EP 06 80 3230 mailed Feb. 4, 2009.
Office Action mailed Jun. 8, 2010 in U.S. Appl. No. 11/939,068.
Final Office Action mailed Oct. 13, 2010 in U.S. Appl. No. 11/939,068.
Notice of Allowance mailed Nov. 2, 2010 in U.S. Appl. No. 12/833,616.
U.S. Appl. No. 60/664,986, filed Mar. 24, 2005, by Li Deng entitled, "A Scheme of Sending Email to Mobile Devices."
Rosenberg J., et al., "SIP Session Initiation Protocol," Standards Track RFC 3261, Memo of Network Working Group, The Internet Society, 2002, 269 pp.
Sinnreich H., et al., U.S. Appl. No. 60/601,256 entitled "Communications System with WIP-Based Fixed-Mobile Convergence," filed Aug. 13, 2004, 38 pp.

* cited by examiner

METHOD FOR DISTRIBUTING DATA, ADAPTED FOR MOBILE DEVICES

RELATED APPLICATION

This application claims the benefit of U.S. Provisional Patent Application No. 60/715,415, entitled "Private Mobile Networks" filed on Sep. 9, 2005 by inventors Martin Frid-Nielsen, Song Huang and Steven Ray Boye. That application is incorporated by reference for all purposes.

BACKGROUND

This application relates to the field of networks of computers and allied devices, and more specifically to networks that specifically include mobile devices.

A number of trends are converging to impact computer networks and the ways in which their users interact. Perhaps most important is the increasing capability of mobile devices, such as cellular telephones, mobile email devices (most notably those sold under the BlackBerry trademark), and personal data assistants (PDA's). Devices actually labeled "computers" are shrinking rapidly in size, having already evolved from "portable" to "laptop" to "notebook" in size. Multifunction devices are now common—BlackBerry brand devices now include cellular telephones, and both they and most cellular telephone devices now include internet browsers as integral standard equipment.

This technical evolution has been accompanied by increasing use of, and reliance upon, such devices by business persons. The general expectation has arisen that a businessperson should be connected by telephone, email and internet at all times and all places.

Rising equipment capabilities have not been accompanied by an equivalent increase in operational capabilities, however. One may be able to use a cellular telephone handset to connect with her business LAN, for example, but the network will persist in treating her as a "computer" user, sending data in a format aimed at a "computer" display. Even email-capable mobile devices, such as those sold by Nokia, which can accept and handle plain text, cannot handle many common document types, such as Microsoft Excel spreadsheets, in a usable manner.

Another aspect of that problem is seen in the fact that many businesses and individuals are amassing data by the terabyte, yet that data is largely inaccessible by mobile users. Even if a person can gain access to a conventional network using his BlackBerry device, for example, the fact that the network is designed for "computer" users limits his ability, working over a mobile telephone signal, to take advantage of network features. Today mobile users are typically supposed to copy the information they will need onto their mobile devices before they leave the office or home environment, subject to the storage limitations on the mobile devices, which leaves no room to handle unforeseen needs for other information while being mobile.

Frustration is compounded by the fact that his data is most probably backed up on a central server. Backup systems, however, are generally designed for the sole purpose of storing data, and their functionality is limited to restoring that data, most often only on the equipment from which it was originally stored, or a substitute.

The shortcomings of conventional networks not only impact users themselves, but also users' interactions with those around them. A common scenario when a business person is away from her home base is a need to share data with a business partner or associate from a different organization. Often, both persons are operating mobile, and what is needed is a capability to use on-hand devices, from the group noted above, to search for, located, transmit and receive data. The problem is often compounded by the fact that mobile device software is generally provided by the network provider, so that even if a user could manage to receive data formatted for her device, she would have problems sharing that data with someone operating on a different network. With conventional networks, all one can do is wait until a network-capable service is available.

At bottom, conventional networks are designed to accommodate mobile devices only to the extent that those devices emulate desktop computers. What is needed is a network specifically designed to service both desktop and mobile equipment, one that allows a mobile user to take full advantage of network functionality from a mobile device. One aspect of such a network should be the seamless provision of data in a manner that fully accommodates a device's memory and screen capabilities. Another aspect of such a network would be the continuous access to user data, with complete search, download and forwarding capabilities.

SUMMARY OF THE INVENTION

One aspect of the invention is a method for distributing data in a heterogeneous network. The method operates on a private mobile network, which includes a mobility server, mobile components and fixed components, on which the mobility server includes data storage units that store data on behalf of network members, at least some of such data being stored in multiple data formats. The distribution method includes transmitting upon request selected said data to addressees, each such transmission being formatted for acceptance by each respective addressee.

In another aspect of the invention of distribution data in a heterogeneous network, a private mobile network includes a mobility server, mobile components and fixed components. The mobility server includes data storage units that store data related to network members, including data reflecting personal information and data reflecting information concerning equipment. The latter includes information regarding memory capacity, screen characteristics and data rendering capabilities of such equipment. The server also stores data on behalf of network members, at least some of such data is stored in multiple data formats. The process includes a step of accepting a data distribution request, in the form of either a message originating within or outside the network, or a data access request from a network member, and then preparing the required data for distribution. That preparation includes the steps of determining delivery format requirements, based on the format acceptance criteria of the delivery recipient and determining whether data format rendering is required, based on the format of the required data, including available stored copies of the data. In the event rendering is required, this step determines the optimum network location at which to perform such rendering and effects such rendering. Another process step is transmitting the data to all addressees, each transmission being formatted for acceptance by each respective addressee. Still another process step is tracking the data after transmission, and then notifying preselected parties upon the occurrence of preselected actions regarding the data.

Other features and aspects of the invention are described in the claims appended hereto, which solely define the invention.

DETAILED DESCRIPTION

The following detailed description refers to the figures. The description addresses a number of embodiments, which are presented to illustrate, not to limit, the scope of the claim, which alone define the invention. Many aspects of the implementation of the invention will be clear to those of ordinary skill in the art, and such persons will recognize and understand such details, as well as how to implement equivalent solutions known in the art.

Figure 1:
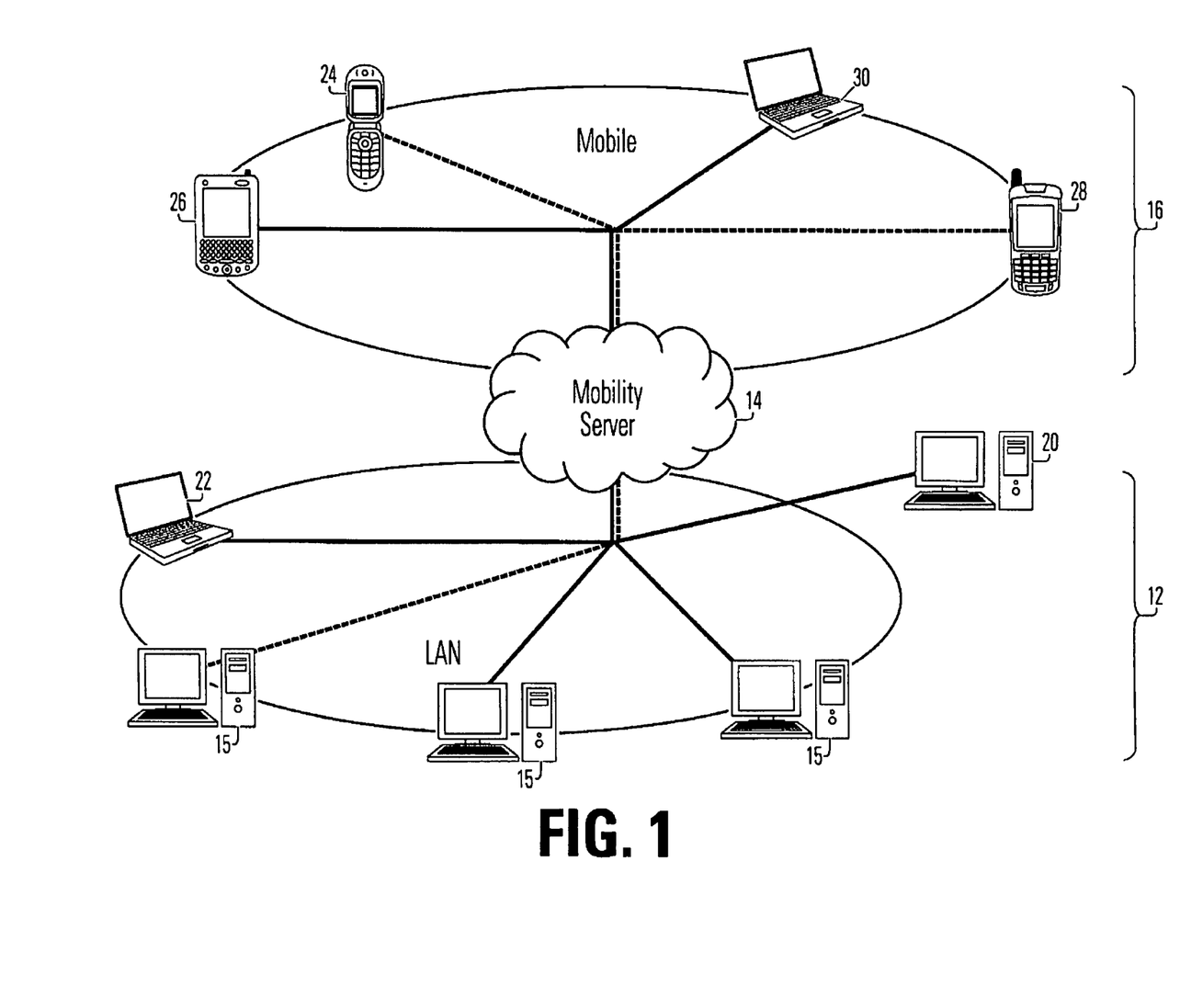
FIG. 1 is a schematic representation of a mobile service network in accordance with the present invention.

A private mobile network ("PMN") 10 in accordance with the present invention is shown in FIG. 1. The network is heterogeneous, including a number of member types. Generally, the PMN can be divided into three broad portions. Fixed components 12 are generally those network members whose locations do not change, such as desktop PC's 15. Desktop PC's can access the PMN through the communication channels of a local area network ("LAN") 18, or independent desktop PC's 20 can employ direct communication channels. Alternatively, members of a LAN may access that network, and thence the PMN, via a remote virtual private network ("VPN") 17. The various communication modes shown here form no part of the invention and are well known to those in the art.

Mobile components 16 consist of devices that are likely to travel with their users, such as cellular telephones 24, email-enabled integrated devices 26 such as that sold under the BlackBerry trademark, or Personal Digital Assistant devices 28. It should be noted that the foregoing list of mobile devices addresses devices in wide use at the time the present application is written; undoubtedly the future will bring changes to that list, without affecting the invention claimed herein. laptop It should be noted that the division of PMN members into categories of "fixed" and "mobile" is not susceptible to hard and fast divisions. For example, laptop or notebook PC's may be employed as fixed devices 22, which may include docking stations or external devices, such as storage devices, to enhance capabilities, or as true mobile devices 30, moving with a user as desired. To some extent the division is based upon capabilities, as will be further seen below. For example, fixed components will often be able to perform data rendering locally, freeing mobile or server assets from that task. Also, to some extent the division is based more on the role being played by a given device at a given time. Most PMN users are expected to utilize both fixed and mobile network components, and a primary expected utility of the present invention will be to facilitate data access and transfer between a user's fixed and mobile devices, as discussed below.

Mobility Server

Figure 2:
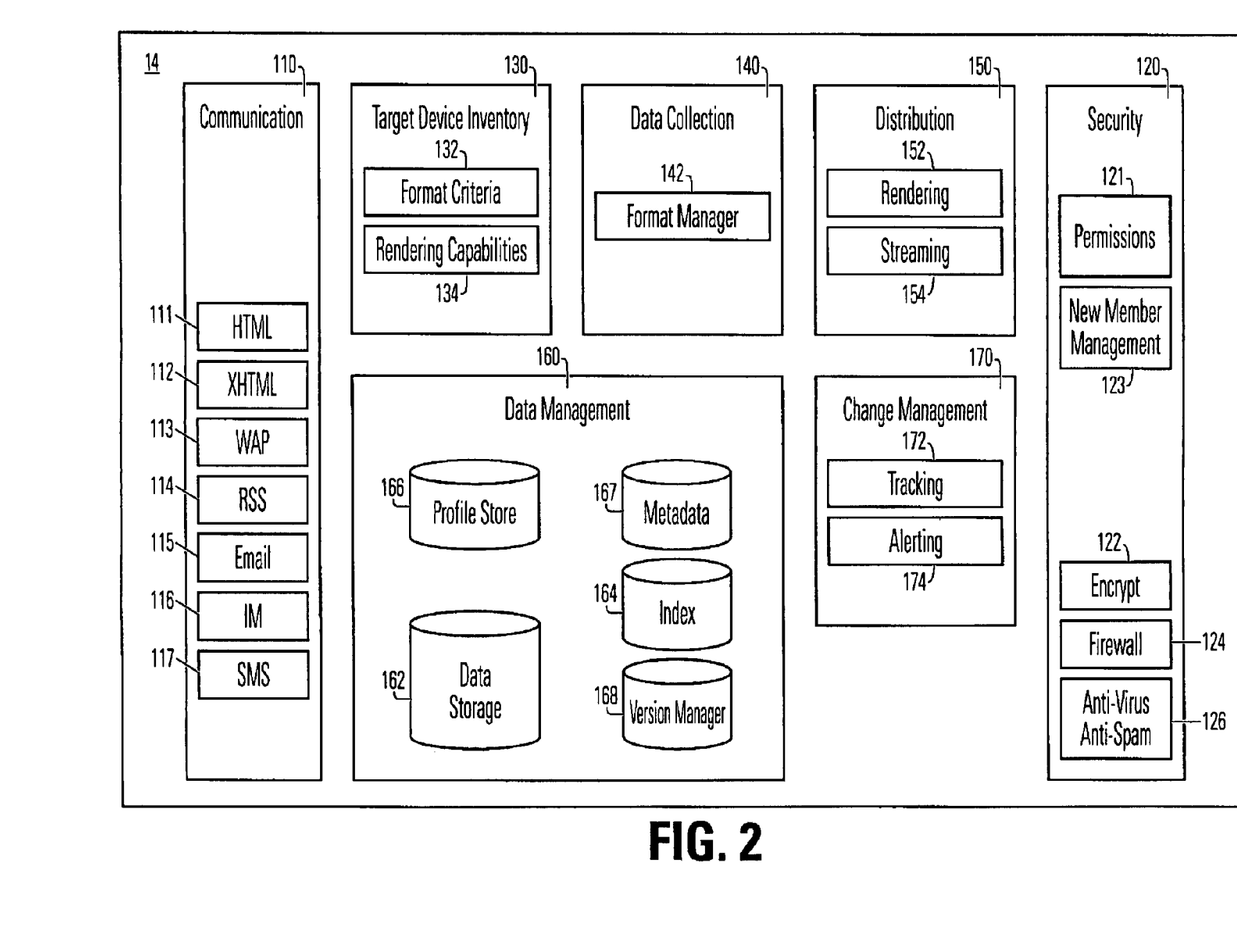
FIG. 2 is a functional block diagram of the mobility server component of a network in accordance with the present invention.

The central node of the PMN is the mobility server 14, shown in functional block form in FIG. 2. The primary components of the mobility server are communication module 110, security module 120, target device inventory module 130, data collection module 140, distribution module 150, data management module 160 and change management module 170. The following discussion sketches out the general functions of the mobility server components, and a more detailed discussion accompanies the description of specific processes, below.

Communication module 110 manages the communication between the mobility server and both fixed and mobile components of the PMN. This module provides communication services for the remainder of the server functionality, utilizing various communication channel adapters, such as adapters for HTML 111, XHTML 112, WAP 113, RSS 114, Email 115, IM 116, and SMS 117. Those in the art will understand that the foregoing list is illustrative only, in that communications channels will change over time, and adapters will be provided in the art to accommodate the same. The functional requirement and operation of a communications module will, however, remain.

It is important to emphasize that although it is convenient and conventional to depict functional blocks as independent entities, these elements continually interact during operation of the mobility server. For example, the communications tasks performed communication module 110 require cooperative action with a number of other components, as will become clear as the discussion progresses below. To note a single example, communication often requires that data be reformatted for the particular needs of mobile devices such as memory and screen-size, so that the assembling and transmission of an HTML document may require rendering of embedded graphics to accommodate the needs of a given mobile device. Other examples will be clear to those in the art.

Security module 120 provides security services, generally in keeping with the requirements of the art. Necessary sub-units provided here would include encryption/decryption module 122, firewall 124, and anti-virus/anti-spam module 126. To a large extent the details of the security module, as well and implementation details, are dictated by the state of the art of network security systems. Although many network systems do not perform anti-virus and anti-spam screening as information travels through the network, those steps would be standard here. It is expected that the state of that art will change over time, and such changes will be implemented without affecting the scope of the present invention. It can be noted that a range of options is available in the field of encryption/decryption systems and devices. It is preferred to employ 128-bit encryption in this application.

Two other modules provide particular to the invention. Permissions module 121 maintains a register of permission linkages that enable widespread and flexible sharing of data across the system. Having such data readily available facilitates sharing information between network members, while maintaining a secure environment. New member module 123 is designed to allow the rapid and simple addition of new members, some on a provisional basis, to enable the rapid sharing of information. For example, this facility permits a member who desires to transfer information to a business acquaintance while at a remote location to bring the acquaintance quickly into the network and initiate the desired file transfer or sharing.

Target device inventory 130 tracks network member devices regarding each device's ability to accept data in various formats, as well as that device's capability to render data in various forms. Such information is generally gathered during a network member's initial configuration or as change information by a member. This module interacts with profile store 166 to store device-related data.

Within the target device inventory, a format criteria register 132 maintains information about the format in which various data types must be presented to each device or specific users device, together with basic device information such as the amount of memory available, the screen type and size. For example, mobile devices may not be able to display formatted text from word processing programs such as Microsoft Word, or spreadsheets from programs such as Microsoft Excel. Sending data in such native formats does a user no good, as at best they register is having been received but cannot be displayed. Similarly, rendering capability register 134 tracks the rendering capabilities of each network member. Taking the previous example one step further, if one wishes to transmit a spreadsheet to a mobile phone, the spreadsheet must be rendered in a format that the handset can receive and display. Converting the spreadsheet to that format at the point of origin may well be the fastest and most efficient way to accomplish that goal, and thus knowing whether that capability exists at the originating member is a key data item.

Data collection module 140 oversees the collection of data from network members into the storage system. As discussed in more detail in connection with FIG. 4 below, incoming data is not simply dumped into the data storage system. Rather, the data collection module, operating through the Format Manager 142, determines where data is to be stored, what formats it will be stored in, and other operations set out below.

Figure 5:
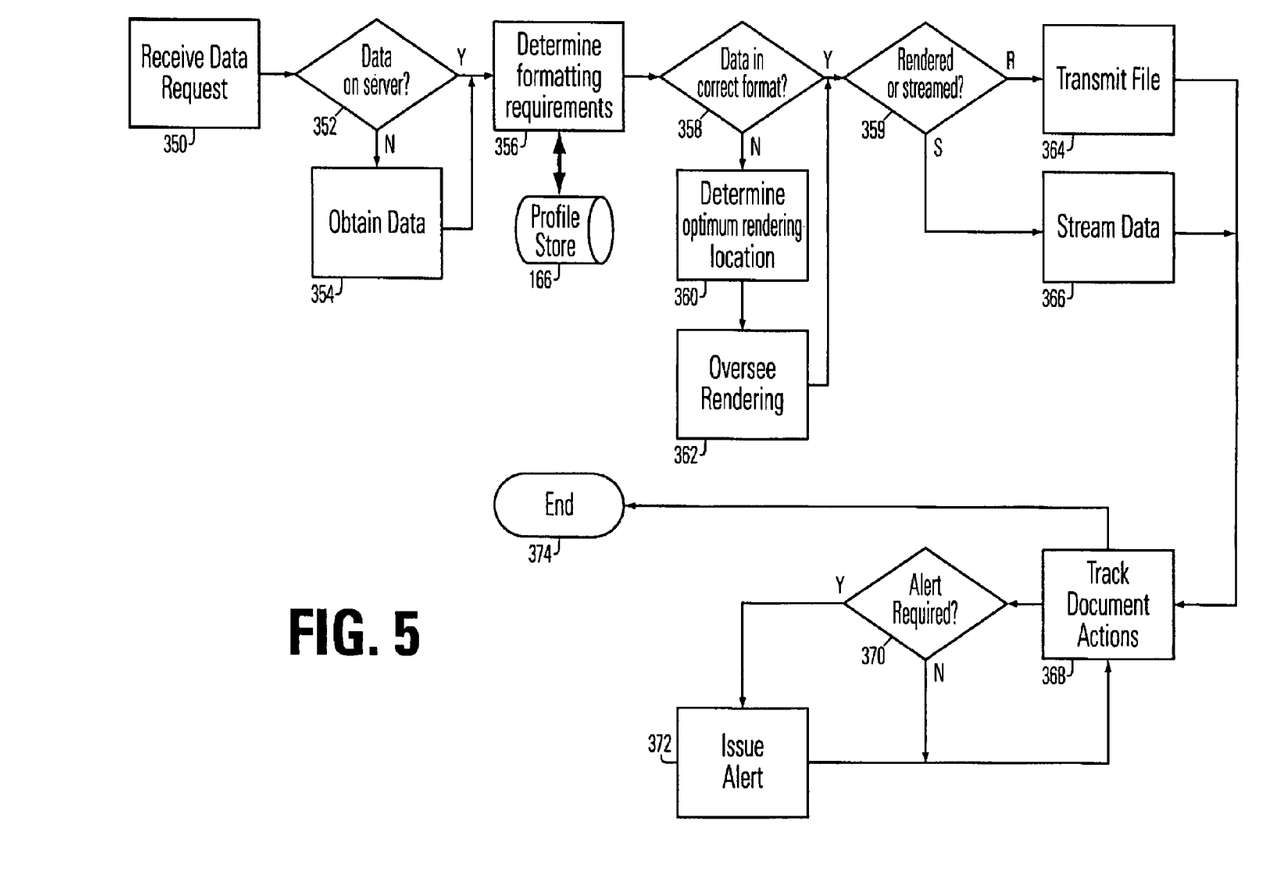
FIG. 5 is a flowchart depicting a data distribution process in accordance with the present invention.

Distribution module 160 handles the distribution of data from the mobility server to network members, as discussed more fully in connection with FIG. 5 below. Two subunits assist in this function: a rendering module 152 performs the rendering function, translating data from one format to another, as required. A separate functionality is provided by streaming module 154, which provides the capability to stream data directly from the mobility server to the user. This latter capability is particularly useful for media such as video or sound files, as it allows a member direct access to such media, rather than having to download and later find a suitable device on which to run the file.

Data management module 160 occupies a key position in the system, as it manages the actual storage process. Many of the operations of this module are set out in connection with detailed discussion of processes, below. Five data storage units perform the actual storage functions—primary data store 162, with the central index 164; member profile store 166; metadata store 167; and version manager 168. The central data store and its associated index comprise a large-scale database system, capable of storing data in any format, with state-of-the-art indexing, search and retrieval capabilities. Such database systems are well-known in the art, supplied by vendors such as Oracle, Microsoft, MySQL and the like. Such systems can be adapted to the ends described herein, and as technology develops, more capable database systems may be implemented in their place, all within the scope of the present invention. It should be noted that data management module 160 handles the most critical data tasks for the system, but many other subsystems perform their own data management activities. Security module 120, for example, maintains data concerning permissions, new member activities, etc.

Member profile store 166 is a separate data store devoted to the task of handling member-related information. A separate system is devoted to this task because dealing with member information rapidly and efficiently is a mission-critical task in this system, made more complicated by the mix of mobile and fixed devices. This database stores all member-specific data items, including fixed personal data (name, address, etc.), device information associated with a member (equipment ID, memory capacity, screen capacity, rendering capacity, etc.) and activity information (alert triggers and history, tracking history).

Metadata store 167 is likewise an important aspect of the system. Metadata includes a variety of information about the data itself, such as permissions, sharing information, monitoring or alert information, or change information, to list a few possible types. In the present system, metadata becomes more important than in other types of systems, as the system is designed to promote data sharing and data accessibility. Also, the emphasis on mobile users places a premium on network speed and flexibility.

Version manager 168 oversees the storage and tracking of document versions, as discussed more fully below. A number of technologies are available to those in the art, who will understand how best to implement a suitable system.

Change management module 170 monitors documents and data across the network, to provide two key functions. First, tracking module 172 monitors all actions taken regarding a document by a member. For example, if a document is delivered to a user, who then opens the document, makes changes to the document and then forwards the document to a third party, all of those actions are recorded by the tracking module. Tracking results are stored in the profile store 166. Alerting module 174 calls users' attention to the occurrence of specified events, such as document actions noted above or actions in the environment. Both processes are described more fully below, in connection with FIG. 5.

The mobility server is installed and operated in a large-scale data center, based on well-known design and operating standards. One embodiment of the mobility server, for example, would employ an architecture that groups physical servers into server cells for optimum storage and administration. Such a system would preferably utilize servers with dual processors operating at state-of-the-art clock rates, such as 3 Ghz; dual gigabit network cards; and mass storage capability such as 12 250 GB disks in Raid5 configuration, providing a total of 2.5 TB storage capability. Those in the art understand that such equipment can be obtained from vendors such as 3Ware and the like. It is preferred to employ a Linux operating system and MySQL as a database server, with AFS (Andrew File System), a Unix/Linux based file system allowing mapping of all drives available in a Server Cell into a single logical file system. Other details of the preferred system are well-known in the art. Another embodiment of the present invention could employ a considerably less sophisticated or elaborate hardware landscape, as will be understood by those in the art.

Network Agent

Figure 3:
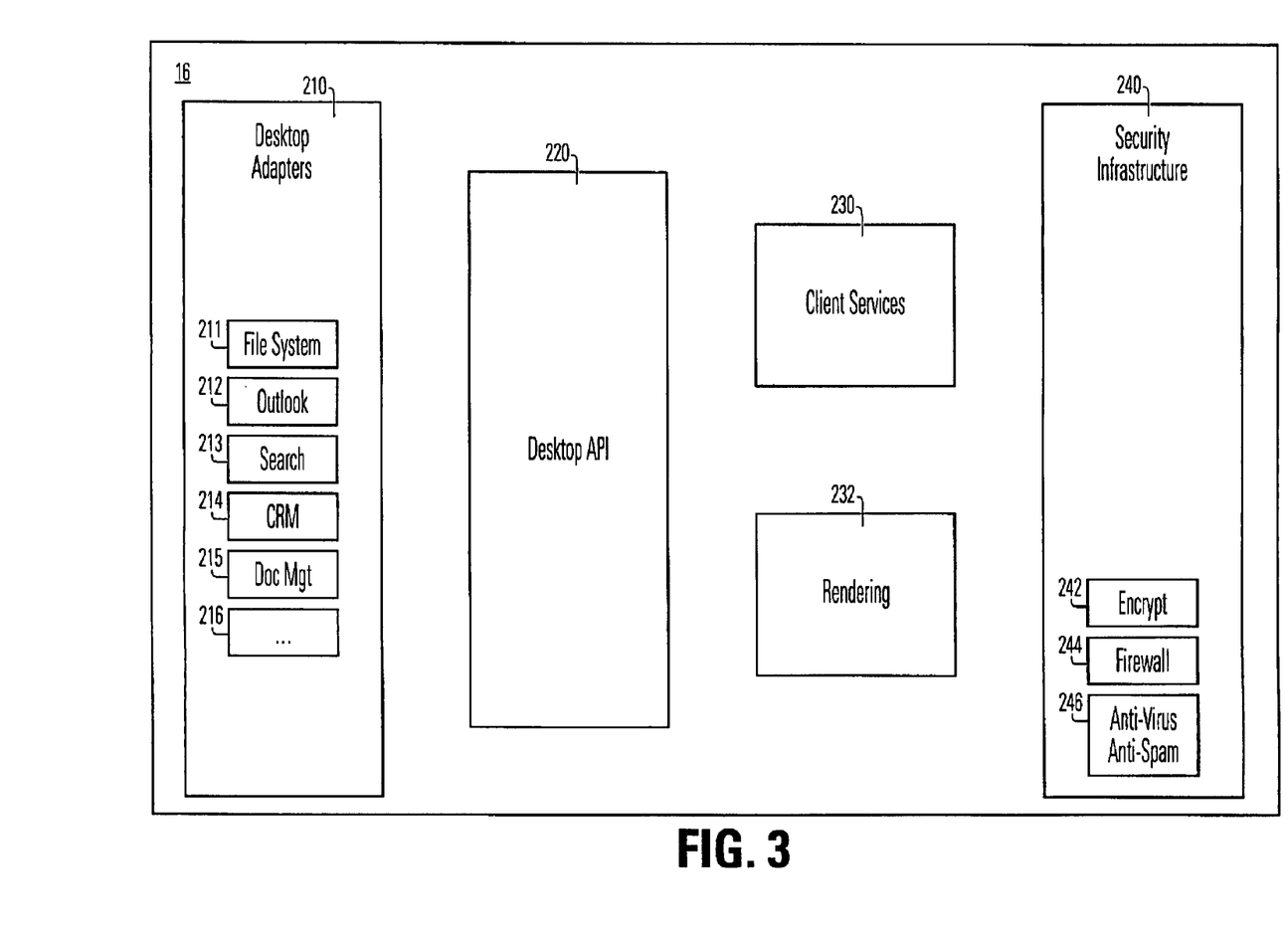
FIG. 3 is a functional block diagram of a network agent component of a network in accordance with the present invention.

The mobility server is assisted by network agent 16, resident on each network component (or "host" component) capable of mounting such software. The agent acts as a network client on all fixed network components and those mobile components, such as laptops and PDA's that will accept client software.

The agent interfaces to the mobility server through Security Infrastructure 240. This element includes a firewall 244 as well as encryption service 242 and anti-spam/anti-virus subsystems 242 and 246. These services can be configured as supplemental to, or in lieu of, similar systems on the host system.

Desktop API 220 integrates agent functionality to the operations of the host computer, and such API's are furnished as required to provide compatibility with various PC architectures and desktop applications being offered. One API, for example, would allow the agent to operate within a Microsoft Windows environment, while others would provide for operation in Apple Macintosh and Linux environments. The API must provide clear and accessible interface points to allow the creation of additional desktop adapters to integrate with emerging desktop functions.

The desktop adapters 210 provide the working interfaces between the agent and applications running on the local host, such as word processing, office support and other applications. These modules are written under the API to allow tight integration to key desktop functionality, such as the file system adapter 211, Microsoft Outlook adapter 212, search engine adapter 213, CRM (Customer Relationship Management) system adapter 214, document management system adapter 215, and other adapters 216. The system is designed for easy development of new or improved adapters as required by technology developments. It should be noted that desktop adapters not only integrate with applications running on the local hardware (such as Microsoft Outlook, for example), but also with applications such as CRM, which may be operating in a client-server or pure web-based configuration but accessible from the desktop.

Client services module 230 performs both operational and administrative services for the system. Operationally, this module oversees the local portion of the automatic backup process, described below in connection with FIG. 4a. Administratively, this module provides a number of services that ensure efficient operation of the system. For example, balancing workload is an important task, so that this module operates in conjunction with similar modules at the mobility server level to schedule and allocate tasks to optimize both functionality and efficiency. Timing of data communication activities, such as uploading and downloading, which typically require high bandwidth, can be spread to off-peak times to smooth the load on scarce resources. The agent and similar control systems on the server would cooperate to balance workload at both the local host and the server, allocating tasks to locations that can best handle them under the existing conditions of workload and traffic. Such activities are within the knowledge of those in the art. The preferred form of the agent further ensures tight integration between the agent and the host system by providing robust multithreaded monitoring in the client services module.

Rendering is such a key aspect of the present invention that a rendering module 232 is devoted to managing that activity at the local level. As will be seen in connection with both the automatic backup and distribution processes, described in detail below, data is provided to the network in a variety of formats. Generally it will be preferable to perform rendering operations at the local level to conserve server resources and to minimize costs to the individual user.

Agents will be installed on all network members capable of receiving them. It is generally expected that all fixed component members will have a resident agent. Clearly, all laptop devices will likewise have agents installed, as will those PDA's that can usefully accept such software. At the far end of the spectrum, cellular telephone handsets will interact with the network on whatever communication channels are provided, primarily via SMS, as well as taking advantage of the browser capability provided integral with such devices. Over time it is expected that such devices will become more capable, and agents will be provided for such devices as they evolve.

While the description above sets out aspects of an embodiment of the invention, it should be clear that the invention can be implemented in a wide variety of specific forms. For example, the mobility server functionality could be implemented as a conventional server/data center as described above, or it could be structured in a more distributed fashion. The server itself could be structured conventionally, or it could be fashioned under any of the emerging architectures, such as web services, enterprise service architecture, or others. A software-based system is described here, but those in the art understand that the same results could be achieved with a hardware implementation or hybrid (firmware) structure. The network agent, in particular, is apt to undergo considerable alteration from the details described above, given that technology will likely evolve to allow ever greater functionality in ever smaller packages, increasing the ability to incorporate network agent functionality in more and more mobile network members.

In general, the network includes fixed component members, broadly defined as those able to render data in multiple formats; mobile members, which travel with their users; and a central hub that stores information in multiple formats and provides it to users in formats specifically tailored to the needs of their system.

Automatic Backup/Virtual Publication

Figure 4A:
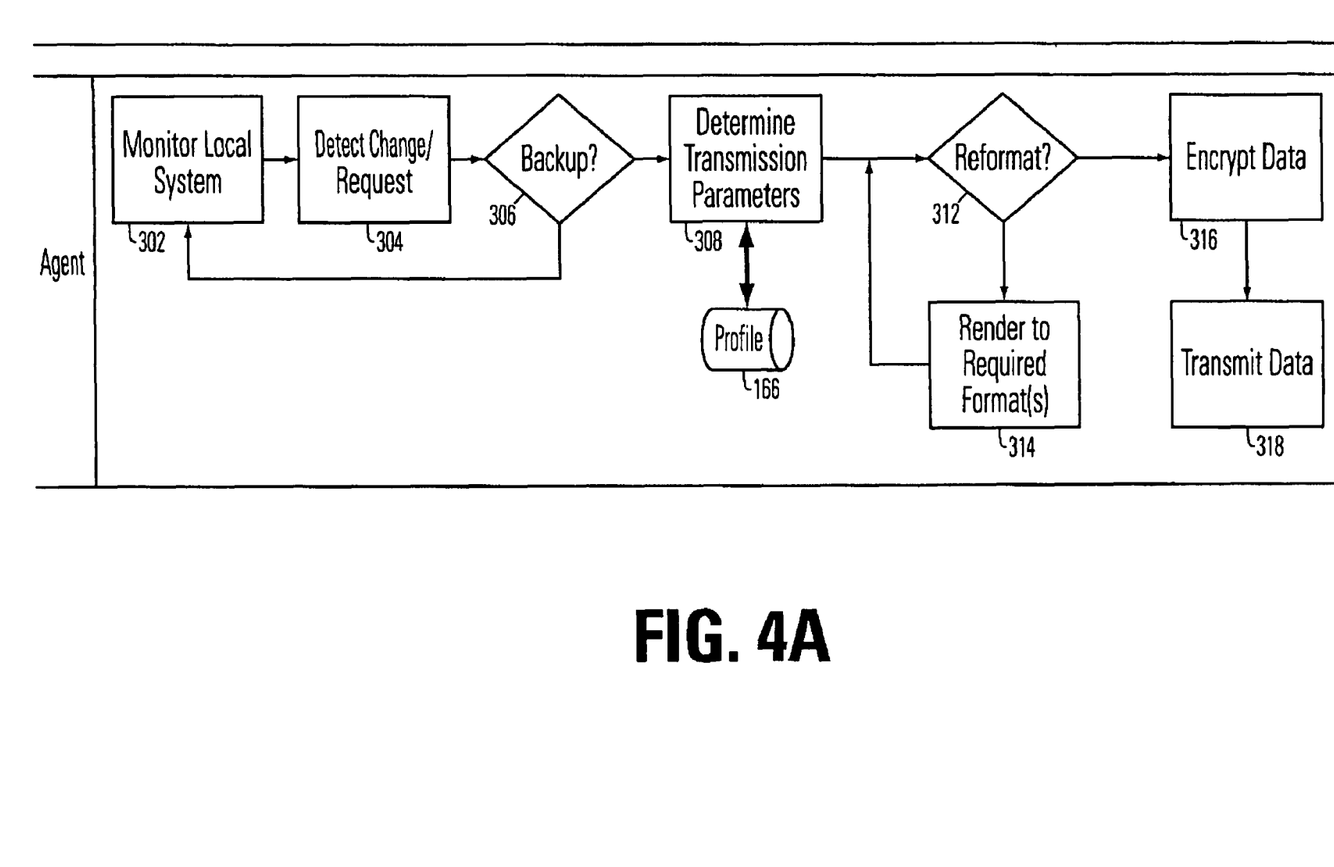
FIG. 4a is a flowchart depicting the network agent portion of an automatic backup process in accordance with the present invention.
Figure 4B:
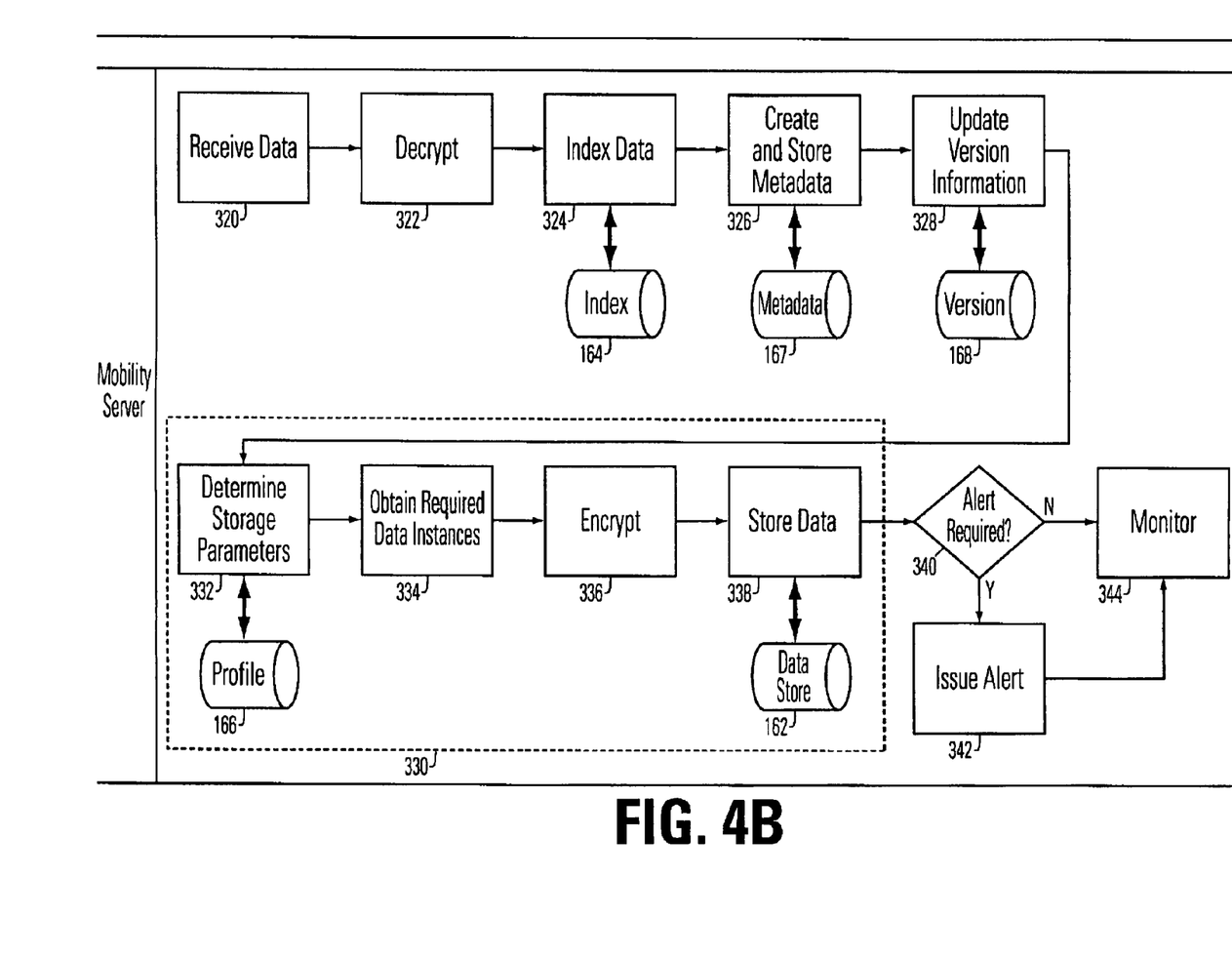
FIG. 4b is a flowchart depicting the mobility server portion of an automatic backup process in accordance with the present invention.

The process of automatically backing up data from a network member is depicted in FIGS. 4a and 4b. This process serves a number of separate objectives. The task of backing up work from a user, immediately and automatically, is the most straightforward, but unlike prior art systems, the present backup method not only backs up data, but also it virtually publishes data in a manner suitable for use on a variety of mobile formats. It should be understood that the term "publish" as used here does not denote actual publication to mobile users, but rather this aspect of the invention makes such publication possible. There being no exact term in the art that exactly fits the present invention, the term "virtual publication" is adopted to describe this process of making formatted data available for later use.

It is also important to distinguish between virtual publication, as shown here, and data backup. The former term implies the provision of data formatted for mobile users, formats generally different from the native data format. This term also implies accessibility by other users. Backup, on the other hand, implies the full storage of all data selected for backup. Moreover, to the extent that backup occurs in some format other than the native data format (a compressed format, for example), that format change generally is hidden from the user, as the data is backed up from the native format and is restored to the same.

As will be seen below, users can engage in both data backup and virtual publication, in any combination of those activities. A user with access to existing backup storage, for example, could elect to virtually publish data without backup. Conversely, a user with no need to communicate to mobile users could elect only to engage in backup activities. Full use of the aspects of the invention presented here, however, entail both backup and virtual publication.

According to an aspect of the present invention, backup activities occur at both the agent (local) and mobility server (network) levels. Steps shown in FIG. 4a take place at the agent, while FIG. 4b depicts actions at the network. This process is executed by data client services module 230 of the agent (FIG. 3).

The network agent continuously performs step 302, monitoring the host system for data changes. This step is accomplished as a result of integration with the host, and those in the art will understand the various methods for implementing such functionality. When a change is detected, at step 304, the system then determines whether the change in question should trigger a backup action, at decision step 306. That decision can be performed in a number of conventional methods, using tables, options and similar known functionalities. Alternatively, the user might expressly desire to virtually publish a document or file, in which case a virtual publication request would likewise occur at step 304.

Step 306 determines whether the data that has been changed by the user should be backed up. Of course, an express virtual publication request would return a "yes" at this point with no further analysis. In one embodiment of the invention, decision steps such as step 306 are governed by backup parameters, predefined by the user. The key variables address questions of what documents to back up and when to do so. The virtual publishing aspect of this process also calls for the user to specify (either in connection with backup parameters or more general user preferences) the likely recipients of data, as well as any special handling or security concerns. Thus, in one aspect of the invention, a user may specify that photographs and videos (which could be identified by file types JPG and AVI, for example) may be accessed by a wide group of users, while word processing documents and spreadsheets are available only to a select group.

Once it is determined that the data file, or document, in question is to be backed up, the agent determines transmission parameters at step 308. These parameters primarily concern whether the data file will be transmitted in its entirety, or only changes will be sent. Also, the system determines what format to employ, and whether multiple copies of the data should be forwarded. The latter factor allows the system to prepare to serve multiple users, on equipment of varying power. For example, a graphics file could be backed up in three formats—a native format file (for example, JPEG, PSD, etc.) at the image size and resolution originally employed; a thumbnail file suitable for previewing; and a low-resolution, small image file suitable for devices such as cellular telephone handsets. Or, formats such as Microsoft Excel, which are difficult for many mobile devices to display, can also be stored as plain text files or pdf documents. The agent makes such determinations by interacting with profile data store 310, which contains user preferences as well as system rules and guidelines.

The determinations of step 308 result in a set of formats in which the data will be stored, which in turn drives the format loop of decision step 312 and reformatting step 314. Several reformatting iterations may be required, as in the graphics example above, which requires the reformatting step to loop back to the input side of the decision step 312. In addition, each re-formatted copy of the data is assigned a storage location. For users desiring only virtual publication without backup, as discussed above, data can be stored where it is most convenient and cost-effective to do so. It may be desirable to store certain data copies on the originating system, thus conserving server storage resources. For example, it may be desired to virtually publish graphic data only in thumbnail and low-resolution forms, avoiding the overhead of storing voluminous graphic files on the server.

Before transmission, data is encrypted at step 318, using any of the well-known methods available to the art. Finally, the data is transmitted, step 318. A preferred method of performing this step is to encrypt the data at the 128-bit level, using any of the widely available products for accomplishing that process, such as those commercially available from VeriSign Inc., and to transmit it over a secure SSL connection.

Automatic backup actions on the mobility server are shown in FIG. 4b. This process is the responsibility of the data collection module 140 shown in FIG. 2. At the outset, the data is received (step 320), decrypted (step 322) and then indexed (step 324). The index operation involves central index 164.

Creation and storage of metadata at step 326, interacting with metadata store 167, is key to providing continuous availability of information. Choice of what elements to include in metadata are within the skill of those in the art, as required by particular applications.

The versioning subsystem, step 328, operates in conjunction with version store 168. Details of versioning systems are known in the art, but in one system according to the present invention, versioning is fully configurable by the user to determine exactly how many versions of a document are saved, and similar options.

Steps 332-338 collectively make up the virtual publication process 330, shown within a dotted-line box in FIG. 4b. The key feature of this process is that it does not simply back up or store data. Rather, data is made available for later use by other users. The distinction is clear in the art, as backup systems are characterized by narrow functional profiles, while publication denotes making the document available at least to a group of users. As noted below, the fact that the system does not publish data directly to users has led to the adoption of the term "virtual publication" to describe this aspect of the invention.

The virtual publication process begins with determination of storage parameters, step 332, interacting with the profile store 166. Determined here are the formats in which to store the incoming data. A number of methods can be used to obtain that result, but here it is preferred that the member profile include that information, which avoids additional processing overhead at this point. That listing could be obtained in a number of ways, either directly or dynamically in cooperation with the target device inventory 130 of the mobility server (FIG. 2).

Next, the system obtains the required data instances, step 334. To do this, the system compares the list of required formats from the preceding step to the formats in which the agent transmitted data to the mobility server. If additional data rendering is required, the system here determines where that rendering should be accomplished and oversees the execution of that action. Generally it is expected that the agent will have accomplished as much rendering as possible at the local host level.

From here, the data is encrypted in step 336 and then stored in step 338, employing central data store 162. Data storage is discussed in more detail in connection with FIG. 2. In the case of data designated "virtual publication only", the actual storage step is not carried out.

After the storage is complete, the system returns to monitoring status in step 346. It is expected that users will maintain an open connection between fixed members (and any mobile members maintaining an internet connection, as can occur now with laptop users and in the future with other devices) and the mobility server, primarily to facilitate the automatic backup process described below.

Distribution

The task of making data available to users is simple in a conventional situation—the data is stored in an accessible location, and users log in to that system and download the data. In a mobile environment, however, that situation is not the norm. Users can access the system from devices having a variety of data capabilities, in terms of device memory and screen capabilities. The distribution process depicted in FIG. 5 deals with such situations. This process is executed by two of the mobility server functional blocks shown on FIG. 2. The distribution phase, steps 350-366, is overseen by distribution module 150; the tracking phase, steps 368-374 is managed by change management system 170.

The distribution phase is initiated by a user requesting a data download, in step 350. It should be noted that users should be afforded sufficient flexibility in presenting a data download request, so that requests can be made, for example, not only for data to be downloaded to the device being employed by a user at that time, but also to another device associated with that user, or, via forwarding, to another location entirely. Also, the present description omits any mention of security procedures that should be implemented in connection with data downloads, as such procedures are within the knowledge of those in the art. Based on security settings, one user can grant data sharing privileges to a many or few other users as desired.

Next, step 352, is to determine whether the required data is located on the mobility server or its associated data store (see FIG. 2). As will be recalled, data may be stored at the server or at the user's location, based on criteria discussed in connection with FIG. 4. If data is located somewhere other than at the mobility server, the decision step routes program flow to step 354, where the data is retrieved. As data is received—not awaiting it in entirety—it will passed through the mobility for the remaining parts of the process, which allows the device to start receiving a response sooner, not leading it to believe the data is unavailable.

Then the system determines formatting requirements for the download, at step 356. This process requires several sub-processes, in that the correct format depends on the receiving device, which in turn should be pre-associated with a user, and the subject data, as modified by user preferences. The system should know that User A, for example, uses a BlackBerry™ device, and if that user has requested download of an Excel spreadsheet, then the system should know that the data should be reformatted before transmission. The format determination is supported by interaction with profile store 166. It is highly important that the format data store also identify irreconcilable format problems. For example, a cellular telephone user may request download of a video file. Such data files are usually multiple gigabytes in length, far beyond the capacity of basic telephone handset devices. The system must identify such situations and prevent both technical and user satisfaction issues associated with too much data. The system should be capable of identifying alternative courses of action in the event such impasses are presented. For example, in the video file situation set out above, rather than simply noting that transmission of the video file was not allowed, the system could send one or more thumbnails extracted from the video or simply warn the user that a time-consuming and potentially expensive operation is about to start. Other measures will suggest themselves to those in the art.

If decision step 358 determines that data rendering is required, the system begins at step 360 by identifying the optimum location for conducting that process. That determination depends on a number of factors, including the type of data, file size, the respective overhead loads of potential rendering locations, and system rules or guidelines. Those of skill in the art will be able to fashion appropriate decision algorithms to implement such a determination routine.

Once the rendering location is selected, the system oversees the rendering operation, step 362. If the data requires transmission to another location, that transmission must be accomplished, and then appropriate commands sent to whatever host equipment is involved. It is anticipated that most rendering will occur at the location where the data is stored, whether at the desktop or server.

Finally, it must be determined whether the data is to be sent in the form of a data file or streamed to the user, decision step 357. That determination can be based on user input at the data request, or it can flow from the data type/equipment type combination, or the like. Most such decisions are completely obvious and lend themselves to automated determination. For example, video data files are inherently unsuitable for downloading to devices with limited storage capacity, such as cellphones or PDA's, but they can stream very nicely to such devices. Based on that decision, data is either downloaded as a file in step 364 or streamed in step 366.

Once the data has been distributed to the user, the tracking phase begins, under control of the change management module 170 (FIG. 2). In step 368, all document actions, taken by either the server or by the recipient, are checked to determine whether that action requires an alert to the originator or a third person (step 370). Typical actions include document being delivered, deleted, saved, modified, or forwarded to a third party. If an alert is required, the system notifies the user who requested that notification, at step 372. Of course, tracking is limited to actions that occur on the mobility server, as there is no way of determining actions taken solely on the addressee's system. Tracking continues until receipt of a predefined event indicating the requesting user has finished with the document, such as an indication that the document has been closed or deleted. That point ends the distribution/tracking process, step 374.

CONCLUSION

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for data distribution in a heterogeneous network, systems including logic and resources to carry out data distribution in a heterogeneous network, systems that take advantage of computer-assisted data distribution in a heterogeneous network, media impressed with logic to carry out data distribution in a heterogeneous network, data streams impressed with logic to carry out data distribution in a heterogeneous network, or computer-accessible services that carry out computer-assisted data distribution in a heterogeneous network. It is contemplated that modifications and combinations will readily occur to those skilled in the art, which modifications and combinations will be within the spirit of the invention and the scope of the following claims.

We claim as follows:

1. A method for distributing data in a heterogeneous network using a mobility server for a private mobile network comprising mobile components and fixed components, the mobility server carrying out the steps of:
   inventorying devices of members of the private mobile network;
   recording display capabilities of devices in the inventory;
   receiving a data file from a network member and not from the mobility server, the data file having at least one version each having a respective display format;
   reformatting the data file into an additional version having a display format which a particular device in the inventory has the capability to display;
   storing for subsequent distribution, the additional version and each of the versions in which the data file was received; and
   transmitting upon request, to a target one of the devices in the inventory, a version of the data file which the target device has the capability to display.

2. A method according to claim 1, further comprising the step of determining in dependence upon the inventory that at least the particular device lacks the capability to display files in any of the display formats of the versions in which the data file was received, and wherein the step of reformatting is performed in response to the step of determining.

3. A method according to claim 1, wherein the network member from which the data file is received is one of the members whose devices have their display capabilities recorded in the step of recording.

4. A method according to claim 1, wherein a first one of the data file versions received in the step of receiving includes an image having a particular resolution, and wherein the step of reformatting comprises the step of developing a lover resolution version of the image.

5. A method according to claim 1, wherein a first one of the data file versions received in the step of receiving includes a document in a native file format of a particular application program, and wherein the step of reformatting comprises the step of developing a version of the document in a native file format of a different application program.

6. A method according to claim 1, wherein a first one of the data file versions received in the step of receiving includes a spreadsheet in a native file format of a spreadsheet program, and wherein the step of reformatting comprises the step of developing a plain text version of the spreadsheet.

7. A method according to claim 1, wherein a first one of the data file versions received in the step of receiving includes a spreadsheet in a native file format of a spreadsheet program, and wherein the step of reformatting comprises the step of developing a rendered image version of the spreadsheet.

8. A method according to claim 1, wherein the step of reformatting comprises the step of developing a PDF version of the data file.

9. A method according to claim 1, further comprising the step of joining members into the private mobile network, including the steps of inventorying devices and recording display capabilities.

10. A method according to claim 1, wherein the step of reformatting the data file comprises the steps of:

selecting, from among components of the private mobile network, an optimum component for performing the additional rendering; and overseeing the reformatting at the component selected in the step of selecting.

* * * * *

UNITED STATES PATENT AND TRADEMARK OFFICE
CERTIFICATE OF CORRECTION

PATENT NO. : 8,116,288 B2
APPLICATION NO. : 11/238838
DATED : February 14, 2012
INVENTOR(S) : Frid-Nielsen et al.

It is certified that error appears in the above-identified patent and that said Letters Patent is hereby corrected as shown below:

At column 13, claim number 4, line number 17, replace "lover" with lower.

Signed and Sealed this
Third Day of April, 2012

David J. Kappos
*Director of the United States Patent and Trademark Office*